US005757261A

United States Patent [19]

Becher et al.

[11] Patent Number: 5,757,261

[45] Date of Patent: May 26, 1998

[54] TEMPERATURE CONTROLLER HAVING A BIMETALLIC ELEMENT AND PLURAL HEATING COMPONENTS

[75] Inventors: Michael Becher, Althengstett; Edwin Güttinger, Königsbach, both of Germany

[73] Assignee: Thermik Gerätebau Gmbh, Pforzheim, Germany

[21] Appl. No.: 686,852

[22] Filed: Jul. 26, 1996

[30] Foreign Application Priority Data

Jul. 26, 1995 [DE] Germany ........................ 195 27 253.6

[51] Int. Cl.[6] ........................ H01H 37/14; H02H 5/04

[52] U.S. Cl. ........................ 337/377; 337/104; 337/333; 337/380; 361/105

[58] Field of Search ........................ 337/13, 102, 103–105, 337/112, 141, 327, 333, 358, 377, 379, 380; 361/31, 32, 103, 105, 106; 388/20, 21

[56] References Cited

U.S. PATENT DOCUMENTS 5,367,279 11/1994 Sakai ........................ 337/104

FOREIGN PATENT DOCUMENTS 0 284 916 A2 10/1988 European Pat. Off. .
2 113 388 3/1971 Germany .
41 42 716 A1 6/1993 Germany .
43 36 564 A1 5/1994 Germany .
94 10 952 U 11/1994 Germany .

*Primary Examiner*—Leo P. Picard
*Assistant Examiner*—Jayprakash N. Gandhi
*Attorney, Agent, or Firm*—Harness, Dickey & Pierce, P.L.C.

[57] ABSTRACT

A temperature controller 10 comprises a bimetallic switching device 35 which switches at an excess temperature to protect an electrical device. The bimetallic switching device is accommodated in a housing 12 which has an electrically conductive base and an electrically conductive cover to close this. The cover and the base are connected by an insulation. A first electrical component 17 is connected in series between terminals of the temperature controller at least when the bimetallic switching device is open. A second electrical component 25 being arranged on the bottom of the base is also provided for the bimetallic switching device. The second electrical component 25 is connected in series with the bimetallic switching device 35 between the terminals 37, 39 of the temperature controller 35 at least when the bimetallic switching device 35 is closed. The first electrical component is a he a ting resistor $R_H$ or an insulator 41 with a comparable mechanical construction. The second component 25 is a protective resistor $R_V$ or a short-circuit part 43 with a comparable mechanical construction, so that temperature controllers with purely overheating protection, overheating protection with self-locking function, overheating protection with current sensitivity and overheating protection with self-locking function and current sensitivity can be provided with the same mechanical construction.

12 Claims, 1 Drawing Sheet

Fig. 1
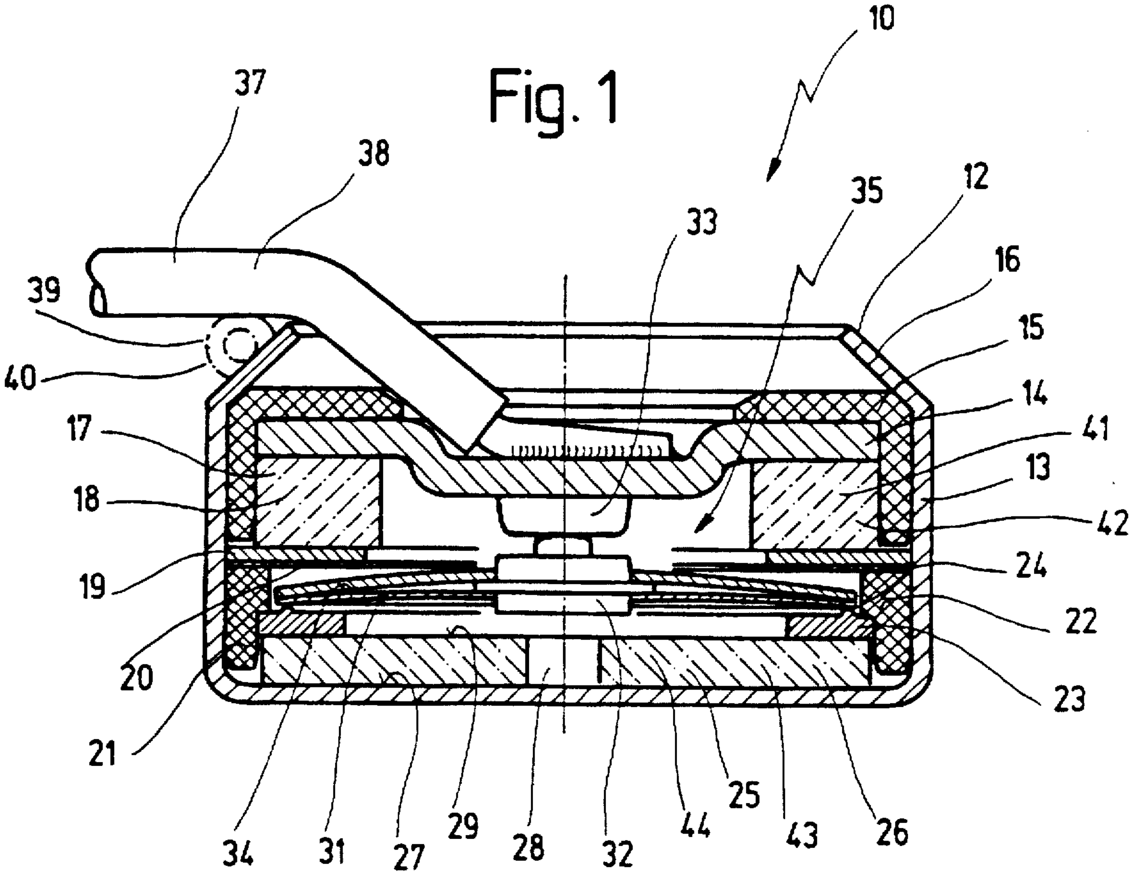
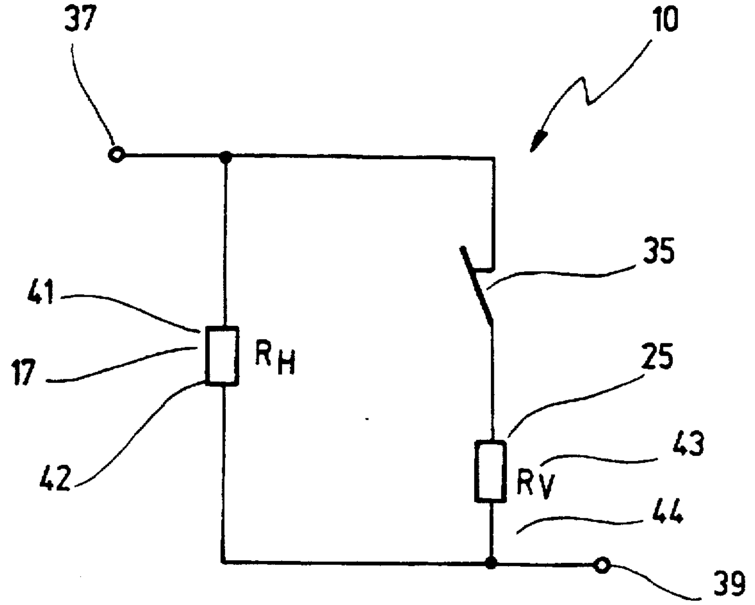
Fig. 2

TEMPERATURE CONTROLLER HAVING A BIMETALLIC ELEMENT AND PLURAL HEATING COMPONENTS

BACKGROUND OF THE INVENTION

1. Field of the Invention

The present invention relates to a temperature controller with a bimetallic switching device which switches at an excess temperature. Such temperature controllers are used to protect electrical consumers, for which purpose they are connected in series with the consumer so that the consumer's operating current flows through the temperature controller. The temperature controller is in close thermal contact with the consumer to be monitored so that this transfers its temperature to the bimetallic switching device. If the temperature of the consumer rises inadmissibly, the bimetallic switching device opens and the flow of current to the consumer is interrupted.

2. Related Prior Art

It is known that this temperature controller can also be provided with a self-locking function and/or an excess current sensitivity.

Such a temperature controller is known from DE-A-41 42 716.

The known temperature controller comprises a bimetallic switching device which opens at an excess temperature or excess current, to which a first heating resistor is connected in parallel and with which the second heating resistor is connected in series.

A further temperature controller known from DE-A-43 36 564 comprises a ceramic carrier plate with a conductive and insulating coating on which an encapsulated bimetallic switching device is arranged, alongside which there is a PTC component which is electrically connected in parallel to the bimetallic switching device and which acts as a first heating resistor. The ceramic carrier plate also bears a thick-film resistor which passes below the bimetallic switching device and is connected in series with this. The protective resistor does not hereby serve as a protection against excess current but to adjust the switching point.

The object of this known temperature controller is to interrupt the flow of current through the electrical consumer if the temperature of this consumer rises excessively or possibly also if the current flowing through the consumer displays excessive values. For this purpose, the known temperature controller is connected in series with the consumer so that the current flowing through the consumer also flows through the temperature controller, whereby the bimetallic switching device is closed at temperatures below the response temperature and/or currents below the response current.

The operating current of the consumer flows with a few ohms through the low-ohmic second heating resistor, which is connected in series, and through the closed contacts of the bimetallic switching device which bridges the first heating resistor. If the temperature of the consumer now exceeds a pre-set limit value, the bimetallic switching device, which is in thermal contact with the consumer, suddenly opens its contacts in that a bimetallic snap disk inside the bimetallic switching devices snaps over. The current now flows through the heating resistor connected in series and through the second heating resistor, whose resistance is so great that the current is much smaller than the original operating current, so that the consumer is switched off, in a manner of speaking. As a result of the PTC characteristics of the second heating resistor in the temperature controller in DE-A-43 36 564, the current drops further when this heating resistor heats up. On account of the heat radiation and/or conduction from this heating resistor, the bimetallic spring disk is heated up further so that it remains self-locked in the position with open contacts. This prevents an automatic re-connection of the consumer which has been switched off due to an excess temperature following cooling, which could lead to a so-called contact flutter with periodic connection and disconnection and is usually undesirable.

If, on the other hand, the current and not the temperature through the consumer, and thus the bimetallic switching device, reaches a pre-set limit value, the heating resistor connected in series heats up in accordance with the description in DE-A-41 42 716 to such an extent that the switch mechanism finally reaches its response temperature and opens. The self-locking in this case is effected in the same manner as described above.

Although the temperature controller known from DE-A-43 36 564 fulfils a number of functional requirements, a disadvantage is that it is relatively bulky and large, due in particular to the ceramic carrier plate. For reasons of accommodation and thermal capacity, such temperature controllers are normally of a very small design, for example they have a diameter of 10 mm and a height of 5 mm, which places extreme requirements on the manufacturing accuracy and also necessitates a simple yet functionally reliable construction.

Such a miniature design of a temperature controller with self-locking through a heating resistor connected in parallel and a heating resistor connected in series which is integrated in a very small space for current monitoring is known from the generic DE-A-41 42 716. The protective resistor is an etched or punched part or a film printed with a resistor and is arranged in the direct vicinity of the spring disk of the bimetallic switching device, being in thermal and electrical contact with this, in such a way that it lies in the bottom half of the housing.

Apart from the complicated assembly of the known temperature controller, a further disadvantage is the fact that the etched or punched part used here as a heating resistor is not very accurate with respect to the resistance value and can only be made for a small resistance range. Moreover, an additional insulating component is also needed between the bottom of the housing and the heating resistor, and generally an additional, externally-mounted high-impedance resistor in series to the aforementioned protective resistor for reasons of resistance adjustment, which on the whole increase the costs of construction and overall dimensions.

Different constructions are known for all of these known temperature controllers which do justice to the respective special field of application and the special circumstances. However, this leads to the necessity of various components for the different temperature controllers, so that manufacturers on the whole have to stock large numbers of different parts.

The inventors of the present application have now recognised that this problem is due in particular to the fact that new such temperature controllers have to be constructed for the different modes of operation of the temperature controller.

SUMMARY OF THE INVENTION

In view of the above, it is an object of the present invention to provide a temperature controller which does not display these disadvantages.

This object is achieved by the invention by a temperature controller designed according to the principle of a modular system with a bimetallic switching device which switches at an excess temperature, a first electrical component assigned to the bimetallic switching device which is connected in series between the terminals of the temperature controller at least when the bimetallic switching device is open, and a second electrical component assigned to the bimetallic switching device which is connected in series with this between the terminals of the temperature controller at least when the bimetallic switching device is closed, whereby the first component is designed as a heating resistor or an insulator with a comparable mechanical construction and/or the second component is designed as a protective resistor or a short-circuit part with a comparable mechanical construction, so that temperature controllers with purely overheating protection, overheating protection with self-locking function, overheating protection with current sensitivity and overheating protection with self-locking function and current sensitivity can be provided with the same mechanical construction.

The object underlying the invention is thus achieved in full. The inventors have recognized, namely, that with a corresponding arrangement of the individual parts it is surprisingly possible to design these as either resistance elements or as a shortcircuit part/insulator, so that only two alternatives of the corresponding components have to be kept in order to be able to assemble a total of four different temperature controllers. The stocking of various parts as known from the state of the art is thus avoided.

It is then preferred if a housing is provided to accommodate the bimetallic switching device which displays a pot-shaped, electrically conductive base and an electrically conductive cover to close this, this being connected to the base by an insulation, whereby the first component is connected between the cover and base, the second component is arranged beneath the bimetallic switching device on the bottom of the base, this being connected between the base and a contact surface, and the bimetallic switching device connects the cover to the contact surface when closed.

This measure is advantageous from constructional aspects since it creates a very compression-proof housing of an electrically conductive base and cover which fully encapsulates the bimetallic switching device so that this is protected against external influences in a known manner. A further advantage is that the new temperature controller can be very easily assembled, namely all that has to be inserted into the base in succession are the second component, then the bimetallic switching device, then the first component and finally the cover, with an interim layer of insulation, whereby an electrical connection between the individual parts must be ensured during insertion.

It is then preferred if the second component is a plate covering the bottom of the base which is connected between the contact surface and the base, whereby the plate either displays an insulating carrier material on which a protective resistor is arranged, which is connected to the contact surface and the base, or itself represents a short-circuit between the contact surface and the base. The contact surface is hereby preferably provided on an electrically conductive ring which is arranged between the plate and the bimetallic switching device.

These measures also have advantages for the construction and assembly, since either a protective resistor or a short-circuit between the contact surface and the base is made by simply inserting the plate into the base and laying the electrically conductive ring on this, no other connecting measures are required.

It is then also preferred if the first component is a ring part on which the cover rests and through whose ring opening the bimetallic switching device makes contact with the cover, whereby the ring part preferably rests on an electrically conductive ring disk which makes conductive contact with the base. The ring part is hereby either made of a resistor material, preferably PTC material, or is an insulator.

This measure also has advantages for the construction and assembly since after insertion of the bimetallic switching device only the electrically conductive ring disk and then the ring part itself have to be inserted into the base, following which the cover is placed on the ring part. The electrical connection between the individual parts results solely through the contact and closure of the base with the cover.

On the whole it is preferred if the bimetallic switching device comprises a fixed switching contact borne by the cover and a corresponding movable switching contact borne by a spring disk which is moved by a bimetallic snap disk and is electrically connected to this, whereby the spring disk preferably rests on the contact surface and the movable switching contact presses against the fixed switching contact when the bimetallic switching device is in its closed state.

This measure also has advantages for the construction and assembly since following insertion of the plate and the electrically conductive ring, the spring disk with the movable switching contact which this bears is then laid on this ring, the bi-metallic snap disk is then fitted over the contact part, after which the electrically conductive ring disk is inserted, on which the ring part and then the cover are placed.

In a further development it is then preferred if a tube-shaped insulating part is provided in the base on which the electrically conductive ring disk rests.

The advantage of this is that firstly there is an electrical insulation between the base on the one hand and the plate, the spring disk and the bimetallic snap disk on the other, whereby this insulation at the same time serves as a support for the electrically conductive ring disk via which the ring part makes contact with the base.

Further advantages can be derived from the description and enclosed drawing.

It is understood that the aforementioned features and those to be explained in the following can be used not only in the specified combinations but also in other combinations or alone without going beyond the scope of the present invention.

BRIEF DESCRIPTION OF THE DRAWINGS

An embodiment of the invention is shown in the drawings and will be explained in more detail in the following description.

FIG. 1 is an axial section through the new temperature controller; and

FIG. 2 is an electric equivalent circuit diagram for the temperature controller shown in FIG. 1.

DESCRIPTION OF A PREFERRED EMBODIMENT

FIG. 1 shows a new temperature controller 10, comprising a housing 12 which displays a base 13 made of electrically conductive material and a cover 14, similarly made of electrically conductive material, which closes the base 13. For this purpose there is an insulating collar 15 between the base 13 and the cover 14 which projects beyond the cover 14 on the sides and slightly on the top. An edge 16 of the base 13 protrudes beyond this insulating collar 15 and is crimped over to close the housing 12.

The cover 14 hereby rests with its underside on a first electrical component 17, which is designed as a ring part 18. The ring part 18 in turn rests on an electrically conductive ring disk 19, whose edges make conductive contact with the base 13.

The ring disk 19 has an insulating layer 20 on its underside which points away from the ring part 18, via which it rests on a tube-shaped insulating part 21. The insulating part 21 has a shoulder 22 which in turn rests on an electrically conductive ring 23 on whose upper side there is a contact surface 24.

The ring 23 in turn rests on a second electrical component 25 in the form of a plate 26 which is arranged on the bottom 27 of the base 13. The plate 26 displays a through-connection 28 which makes a conductive contact between the base 13 and the upper side 29 of the plate 26.

A convex spring disk 31, which bears a movable switching contact 32 which interacts with a fixed switching contact 33 arranged on the cover 14 through the ring part 18, rests on the contact surface 24. A bimetallic snap disk 34 is fitted over the movable switching contact 32, which in the switching state shown in FIG. 1 displays a temperature below its switching temperature.

The spring disk 31, movable switching contact 32, fixed switching contact 33 and bimetallic snap disk 34 together form a bimetallic switching device 35, which in the state shown in FIG. 1 makes an electrically conductive connection between the cover 14 and the contact surface 24. If the temperature of the bimetallic snap disk 24 rises above the switching temperature, the bimetallic snap disk suddenly snaps over from a convex to a concave shape, after which its outer edge now rests on the insulating layer 20 and the movable switching contact is raised from the fixed switching contact 33 against the force of the spring disk 31 so that the electrical connection between the cover 14 and the contact surface 24 mentioned above is opened.

It is mentioned that a litz 38 is provided as a first terminal 37 on the cover 14, whereas a further litz 40 is welded onto the edge 16 of the base 13 as a second terminal 39.

On account of the chosen construction, the first electrical component 17 is connected between the cover 14 and the base 13, whereby a series connection of the bimetallic switching device 35 and the second electrical component 25 is arranged parallel to this first electrical component, as indicated in the electric equivalent circuit diagram shown in FIG. 2.

The temperature controller 10 described up to now is constructed according to the principle of a modular system in that the first electrical component 17 and the second electrical component 25 can be designed on the one hand as heating resistors, though also as insulators/short-circuit parts. The circular part 18 can, for example, be an insulating part 41 or a PTC resistor 42. Similarly, the plate 26 can be either an electric short-circuit part 43 or a carrier part 44 on which an electrical protective resistor Rv is arranged. This protective resistor Rv can, for example, run as a thick-film resistor on the upper surface 29 and be connected between the electrically conductive ring 23 and the through-connection 28.

Depending on the choice of properties of the components 17, 25 temperature controllers 10 with different electrical properties though with identical mechanical constructions can thus be manufactured in a modular manner. If, for example, component 17 is an insulating part 41 and component 25 a short-circuit part 43, the temperature controller 10 assumes a purely temperature monitoring function. If component 25 is fitted with a protective resistor Rv on the other hand, the temperature controller is current sensitive, the flowing current generates heat in the protective resistor Rv which ensures that the bimetallic switching device 35 opens if the current flow becomes too high.

If component 17 is designed as a holding resistor $R_H$ the current flowing through this component 17 when the bimetallic switching device 35 is open ensures that sufficient heat is generated keep the bimetallic switching device 35 open. When the metallic switching device 35 is closed, the resistance of series connection of the bimetallic switching device 35 component 25 is much lower than the resistance of component so that quasi no current flows through this component 17.

What I claim is:

1. A temperature controller design according to the principle of a modular system, comprising:

a bimetallic switching device which switches at an excess temperature, a housing to accommodate the bimetallic switching device which comprises a pot-shaped, electrically conductive base and an electrically conductive cover to close this, the cover being connected to the base by an insulation, first electrical component provided for the bimetallic switching device and connected in series between terminals of the temperature controller at least when the bimetallic switching device is open, and connected between the cover and the base, a second electrical component provided for the bimetallic switching device, arranged beneath the bimetallic switching device on the bottom of the base, connected in series with the bimetallic switching device between the terminals of the temperature controller at least when the bimetallic switching device is closed, and connected between the base and contact surface, the bimetallic switching device connecting the cover to the contact surface when closed, wherein the first electrical component has a comparable mechanical construction as a heating resistor or an insulator, and/or the second electrical component has a comparable mechanical construction as a protective resistor or a short-circuit part, such that temperature controllers with purely overheating protection, overheating protection with self-locking function, overheating protection with current sensitivity and overheating protection with self-locking function and current sensitivity can be provided with the same mechanical construction.

2. The temperature controller in accordance with claim 1, wherein the second component is a plate covering the bottom of the base and connected between the contact surface and the base.

3. The temperature controller in accordance with claim 2, wherein the first component is a ring part on which the cover rests and through whose ring opening the bimetallic switching device makes contact with the cover.

4. The temperature controller in accordance with claim 2, wherein the contact surface is designed on an electrically conductive ring which is arranged between the bimetallic switching device and the plate.

5. The temperature controller in accordance with claim 3, wherein the ring part rests on an electrically conductive ring disk which makes conductive contact with the base.

6. The temperature controller in accordance with claim 3, wherein the plate displays an insulating carrier part on which a protective resistor is arranged which is connected to the contact surface and the base.

7. The temperature controller in accordance with claim 3, wherein the plate itself represents a short-circuit between the contact surface and the base.

8. The temperature controller in accordance with claim 5, wherein the ring part is made of resistor material, preferably PTC material.

9. The temperature controller in accordance with claim 5, wherein the ring part is an insulating part.

10. The temperature controller in accordance with claim 1, wherein the bimetallic switching device comprises a fixed switching contact borne by the cover and a corresponding movable switching contact borne by a spring disk which is moved by a bimetallic snap disk and is electrically connected to this.

11. The temperature controller in accordance with claim 10, wherein the spring disk rests on the contact surface and the movable switching contact presses against the fixed switching contact when the bimetallic switching device is in its closed state.

12. The temperature controller in accordance with claim 10, wherein a tube-shaped insulating part is provided in the base on which the electrically conductive ring disk rests.

* * * * *